US009256768B2

(12) United States Patent
Gluck

(10) Patent No.: US 9,256,768 B2
(45) Date of Patent: *Feb. 9, 2016

(54) MULTI-PURPOSE CREDIT CARD READER APPARATUS

(71) Applicant: Adrian Gluck, Beverly Hills, CA (US)

(72) Inventor: Adrian Gluck, Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/698,260

(22) Filed: Apr. 28, 2015

(65) Prior Publication Data

US 2015/0302225 A1    Oct. 22, 2015

Related U.S. Application Data

(63) Continuation of application No. 14/256,058, filed on Apr. 18, 2014, now Pat. No. 9,016,570.

(51) Int. Cl.
*G06K 7/00* (2006.01)
*G06K 7/08* (2006.01)
*G06Q 20/34* (2012.01)

(52) U.S. Cl.
CPC ............ *G06K 7/0004* (2013.01); *G06K 7/0021* (2013.01); *G06K 7/083* (2013.01); *G06Q 20/341* (2013.01); *G06Q 20/352* (2013.01); *G06Q 20/353* (2013.01)

(58) Field of Classification Search
CPC ............ G06Q 20/322; G06Q 20/3227; G06Q 20/327; G06Q 20/3226; G06Q 20/353; G06K 7/08; G06K 7/082; G06K 7/089; G06K 19/005; G06K 7/0004; G07F 7/0873; G07F 7/0886; G07F 7/0893

USPC ......... 235/375, 380, 381, 435, 439, 440, 486, 235/492

See application file for complete search history.

(56) References Cited

U.S. PATENT DOCUMENTS 6,234,389 B1 * 5/2001 Valliani et al. ................ 235/380
6,579,728 B2   6/2003 Grant et al.
7,252,232 B2   8/2007 Fernandes et al.
7,740,173 B2   6/2010 Von Mueller et al.

(Continued)

OTHER PUBLICATIONS

Lacmanovic, I. et al., "Contactless payment systems based on RFID Technology," MIPRO, 2010 Proceedings of the 33rd International Convention, May 24-28, Opatija, Croatia, 2010 pp. 1114, 1119.

(Continued)

*Primary Examiner* — Thien M Le
*Assistant Examiner* — April Taylor
(74) *Attorney, Agent, or Firm* — Barlow, Joseph & Holmes, Ltd.

(57) ABSTRACT

A credit card reader shields a credit card, stores data from one or more credit cards simultaneously and then selectively broadcasts data associated with one of the cards. A slim, electromagnetically shielding housing has a cavity and a card reader for reading data from a credit card received in the cavity. A processor connects the card reader to a memory component, and connects both to an RFID device, where the credit card data can be broadcast to an RFID reader. A control interface allows a user to initiate reading credit card data, to select a card data set to store in memory, or to broadcast a dataset. A display shows transaction information and stored card data. A retractable input/output plug can engage a socket on another device to transmit and receive data. A memory card device can selectively store credit card data and transaction data.

18 Claims, 4 Drawing Sheets

(56) References Cited

U.S. PATENT DOCUMENTS

| | | |
|---|---|---|
| 7,810,729 B2 | 10/2010 | Morley, Jr. |
| 7,949,373 B2 | 5/2011 | Whiting |
| 7,997,476 B2 | 8/2011 | Gannon |
| 8,011,587 B2 * | 9/2011 | Johnson et al. .......... 235/472.01 |
| 8,376,223 B2 | 2/2013 | Woronee |
| 8,528,812 B2 | 9/2013 | Gannon |
| 8,533,123 B2 | 9/2013 | Hart |
| 8,740,072 B1 * | 6/2014 | Dorogusker ................. 235/441 |
| 2004/0087339 A1 | 5/2004 | Goldthwaite et al. |
| 2005/0247787 A1 | 11/2005 | Von Mueller et al. |
| 2005/0269407 A1 * | 12/2005 | Harmon ............... G06K 7/0008 235/435 |
| 2008/0223932 A1 | 9/2008 | Von Mueller et al. |
| 2009/0108061 A1 * | 4/2009 | Tartavull et al. ............. 235/380 |
| 2011/0140841 A1 * | 6/2011 | Bona et al. .................. 340/5.83 |
| 2011/0240745 A1 * | 10/2011 | Brown ......................... 235/492 |
| 2012/0052910 A1 * | 3/2012 | Mu et al. ...................... 455/558 |
| 2012/0097740 A1 * | 4/2012 | Lamba et al. ................ 235/380 |
| 2012/0284194 A1 | 11/2012 | Liu et al. |
| 2012/0305645 A1 * | 12/2012 | Morley, Jr. ................... 235/380 |
| 2013/0087614 A1 | 4/2013 | Limtao et al. |
| 2013/0130743 A1 | 5/2013 | Lin |
| 2013/0140360 A1 | 6/2013 | Graylin |
| 2013/0146661 A1 | 6/2013 | Melbrod et al. |
| 2013/0200999 A1 | 8/2013 | Spodak et al. |
| 2013/0320089 A1 * | 12/2013 | Marcus et al. ................ 235/449 |
| 2014/0001263 A1 * | 1/2014 | Babu et al. ................... 235/440 |
| 2014/0061301 A1 * | 3/2014 | Cho et al. ..................... 235/380 |
| 2014/0097242 A1 | 4/2014 | McKelvey |
| 2014/0203082 A1 | 7/2014 | Huh |
| 2015/0242663 A1 * | 8/2015 | Babu ................. G06K 7/10297 235/380 |

OTHER PUBLICATIONS

Qadeer, M. A., et al., "A Novel Scheme for Mobile Payment Using RFID-Enabled Smart SIMcard," Future Computer and Communication, 2009 ICFCC 2009, IEEE Computer Society pp. 339, 343.

Smart Card Alliance, "Contactless payment and the retail point of sale: applications, technologies and transaction models," White Paper, 2003.

* cited by examiner

MULTI-PURPOSE CREDIT CARD READER APPARATUS

CROSS-REFERENCE TO RELATED APPLICATIONS

This application is a continuation of U.S. application Ser. No. 14/256,058 filed Apr. 18, 2014, now U.S. Pat. No. 9,016,570, issued Apr. 28, 2015.

BACKGROUND AND SUMMARY OF THE INVENTION

The instant invention relates to a credit card reader apparatus and more particularly to a multi-purpose device for reading card data as well as storing data associated with one or more credit cards and then using that data to emulate a credit card through RFID to complete a credit transaction, similar to a typical credit card transaction. The device is also capable of directly reading card data to receive charges through a merchant account.

The card reader apparatus has a slim, rectangular housing with an internal cavity and an opening at a first end of the housing that allows a user to insert a credit card into the cavity, where a credit card magnetic strip reader in the housing reads magnetic data stored on the credit card. The housing is constructed of shielding material, whereby a card received and stored within the housing cannot be read by unauthorized devices. The housing is also configured to fit within a card fold within a wallet, so a user can conveniently carry the device in a wallet.

The card reader apparatus may be used to read and store data for multiple credit cards, and then allows the user to select data corresponding to one of those credit cards before making a credit transaction by way of an RFID transmission. After a transaction is completed, the credit account corresponding to the selected credit card data is charged, just as if the credit card itself had been used for the transaction.

In use, data is read from the card by the card reader and is transferred to a read/write memory component connected to the central processor. The card reader can simultaneously store card data for more than one credit card. Thus, the user can insert and remove multiple cards, one at a time, so the respective card data is read from each card and then stored into the memory. At a later time, even without a card received in the housing, the user can select a desired dataset corresponding to one of the cards before completing a credit transaction.

For transmitting the card data to another device, the card apparatus includes a radio frequency identification (RFID) device connected to the processor. The processor is configured and arranged to read credit card data from the storage location in the memory component responsive to a selection by the user and to provide the credit card data to the RFID device so the data can then be broadcast to an RFID reader on a receiving device.

To allow a user control the operation of the card reader, the card reader has a control interface that is connected to the processor. The processor and the control reader are configured and arranged so a user can selectively control the card reader to perform various functions such as reading data from a credit card, selectively controlling the card reader to store the credit card data in the memory component, and selectively controlling the card reader to broadcast credit card data through the RFID device.

A display on the card reader provides information to a user regarding the stored credit card data and a credit transaction performed by the card reader. For example, the display can show information such as which set of card data a user has selected, a card name corresponding to the selected card dataset, and the amount of money in a credit transaction (e.g. the dollar amount paid by the user). The display can show other information regarding transactions, such as recent transactions, card information, or other data stored in memory.

The card reader may be operated as a standalone device for card emulation, or it may engage another device, such as a mobile electronic device, by way of a retractable input/output plug located within a second end of the housing. The plug is electrically connected to the processor and configured to transmit data to and receive data from the mobile electronic device. The card reader can send information to the mobile electronic device so the mobile electronic device can store data using its own memory and transmit data over a cellular phone network, a wireless internet network, another network, or through a data transfer device such as a Bluetooth or RFID device. The mobile electronic device can also support software that interfaces with the card reader to allow the user to control and monitor the operation of the card reader through the mobile electronic device and for use in accepting and processing charges through a merchant account.

The retractable input/output plug is extendable so that it extends from the second end of the housing. In this extended position, the plug can be received in a socket on a mobile electronic device, such as an audio port, or another connection port on the mobile electronic device. After the user disengages the plug from the mobile electronic device, the user can retract the plug to a retracted position in which the plug resides substantially or entirely within the housing, making the housing more convenient for storage within a wallet or another carrier.

To prevent rotation of the flat card reader housing with respect to the mobile electronic device when the plug is received in the socket of the mobile electronic device, the card reader may further include a mechanical stabilizer.

The mobile electronic device engaged by the card reader can be a cell phone, a tablet, a personal digital assistant, or another mobile electronic device.

In addition to the memory component, the card reader has a memory card reader that is connected to the processor. The processor is configured to selectively store credit card data and credit transaction data on a memory card received within the memory card reader.

The card reader has a battery power source to provide power to the components of the card reader apparatus.

The RFID device may be a passive RFID device, a semi-passive RFID device, or an active RFID device.

Although the preferred embodiment uses an RFID device, other near field communication devices are contemplated, and are within the scope of the present invention. For example, the card reader could communicate with other devices by way of a Bluetooth transmitter/receiver, an ultra wideband transmitter/receiver, or another near field communication (NFC) transmitter/receiver.

Accordingly, among the objects of the instant invention are: the provision of a credit card reader apparatus that can read and store credit card data from one or more credit cards, and then transmit the data to another device to make a credit transaction. The present invention also provides a credit card reader that can securely house a credit card within an electromagnetically shielded housing. The present invention also provides a credit card reader that can read data from a credit card, store the data from the credit card so the card reader may be used to make a credit transaction even when the corresponding credit card is not received in the card reader. The present invention provides a card reader that can transmit data to and receive data from a mobile electronic device, which can complete a transaction using data from the card reader. The present invention provides a stabilizer that allows the card reader to be securely supported on a mobile electronic device when the two are connected.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated of carrying out the present invention.

DESCRIPTION OF THE PREFERRED EMBODIMENT

Figure 1:
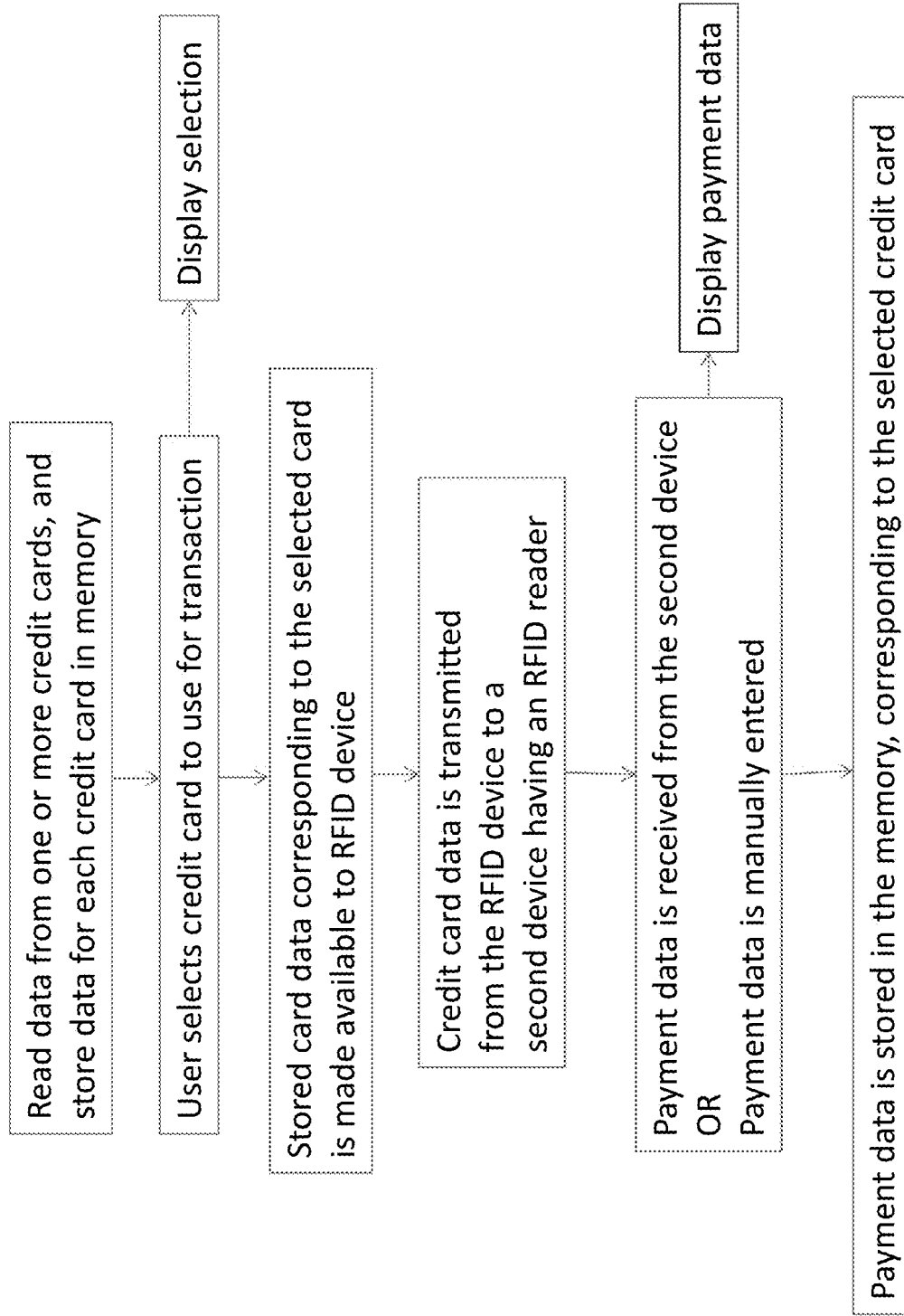
FIG. 1 is a flowchart of the operation of the card reader of the present invention.

Referring now to the drawings, the card reader of the instant invention is illustrated and generally indicated at 10 in FIGS. 1-4. As will hereinafter be more fully described, the instant card reader apparatus provides a portable device capable of emulating a credit card selected from a plurality of credit cards, each credit card having data stored on the card reader apparatus.

The invention particularly relates to storing credit card data in a computer readable storage medium, using an RFID device to broadcast credit card data from the card reader to a second device, and storing card data and payment data on the card reader.

FIG. 1 shows a flowchart of the general operation of an exemplary embodiment of the card reader of the present invention. As will be described in more detail below, the exemplary embodiment of the card reader apparatus allows a user to read data from one or more cards, and store card data for those cards in memory. Then, the user can select one of the cards for a transaction, such as a purchase of an item. The card selected is displayed on a display screen on the card reader. Then, the data corresponding to the selected card is sent to an RFID device, which broadcasts the data to a second device having an RFID reader. After the credit transaction is complete, payment data is received from the second device or payment data is manually entered by the user. This payment data can be shown on the display, and is stored in the memory of the card reader, where it is associated with the card used for the payment.

Figure 2:
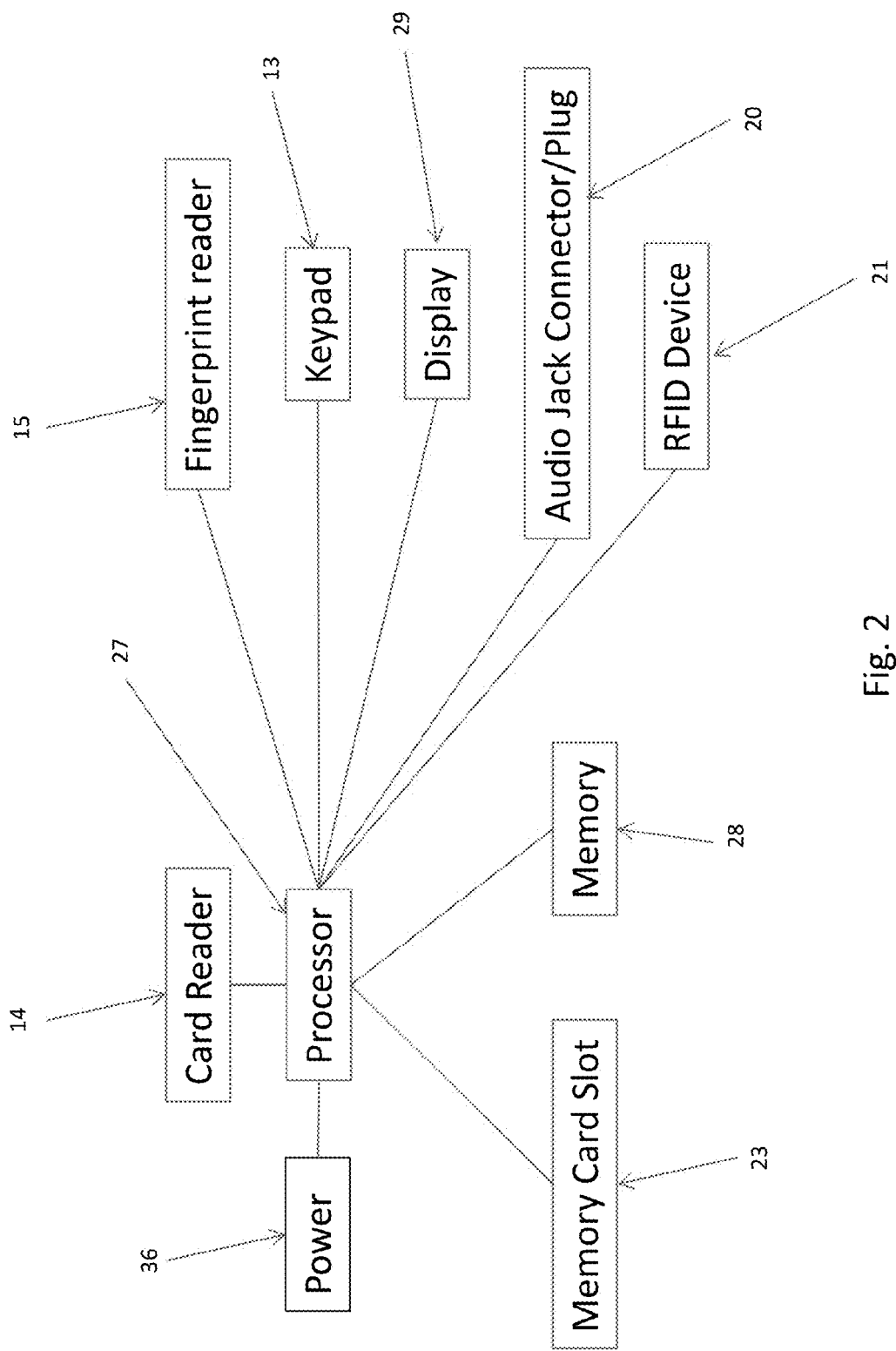
FIG. 2 is a block diagram of the card reader of the present invention.

FIG. 2 shows a block diagram of an exemplary embodiment of the present invention. A processor connects components such as a card reader, a fingerprint reader, a keypad, a display, an audio jack connector/plug, an RFID device, a memory component, and a memory card slot. A power supply may be connected to the processor, which is electrically connected to various devices of the card reader that need an electrical power supply. The operation of these components is described in more detail below.

Figure 3:
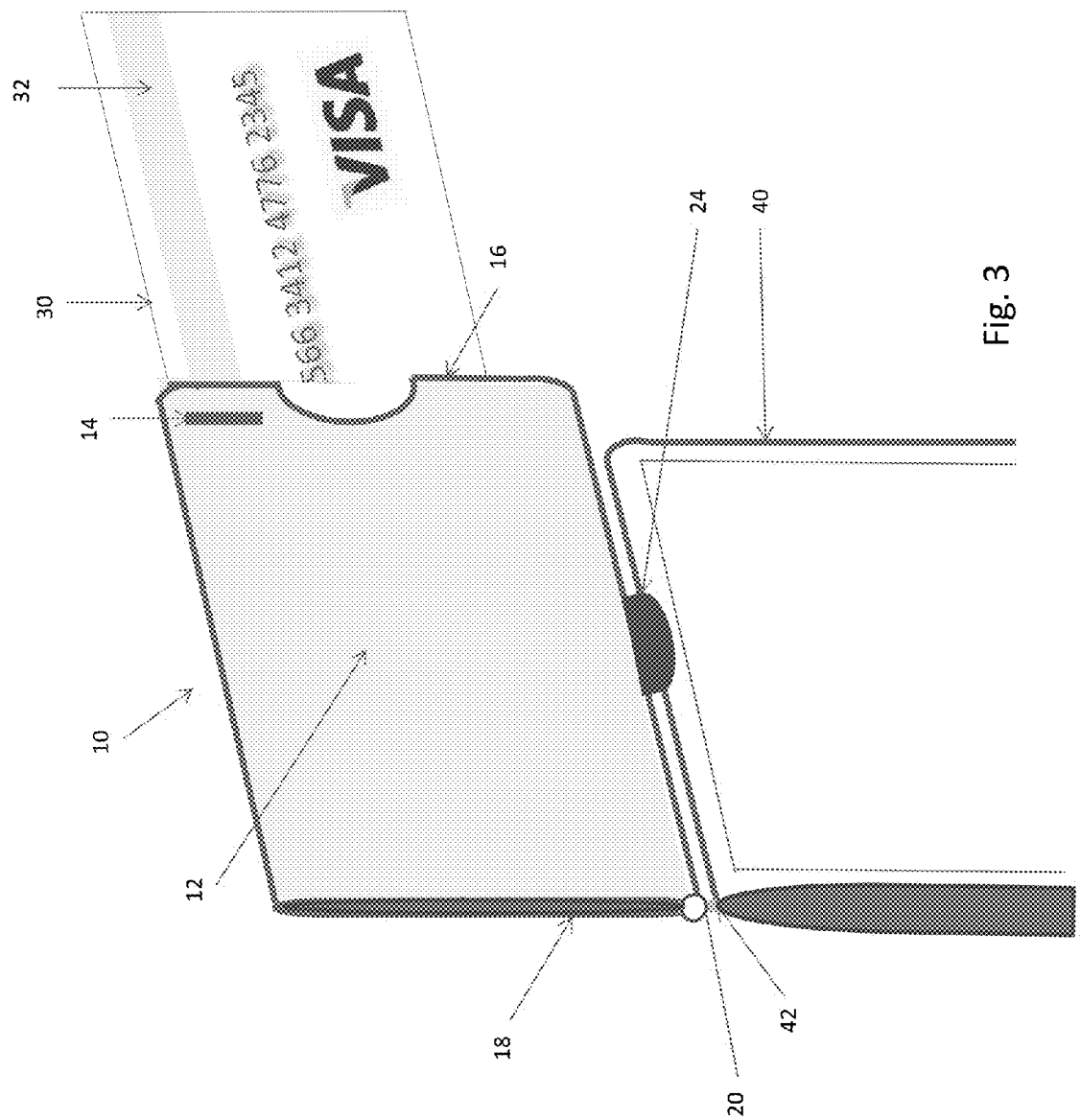
FIG. 3 is a first embodiment of the card reader of the present invention.
Figure 4:
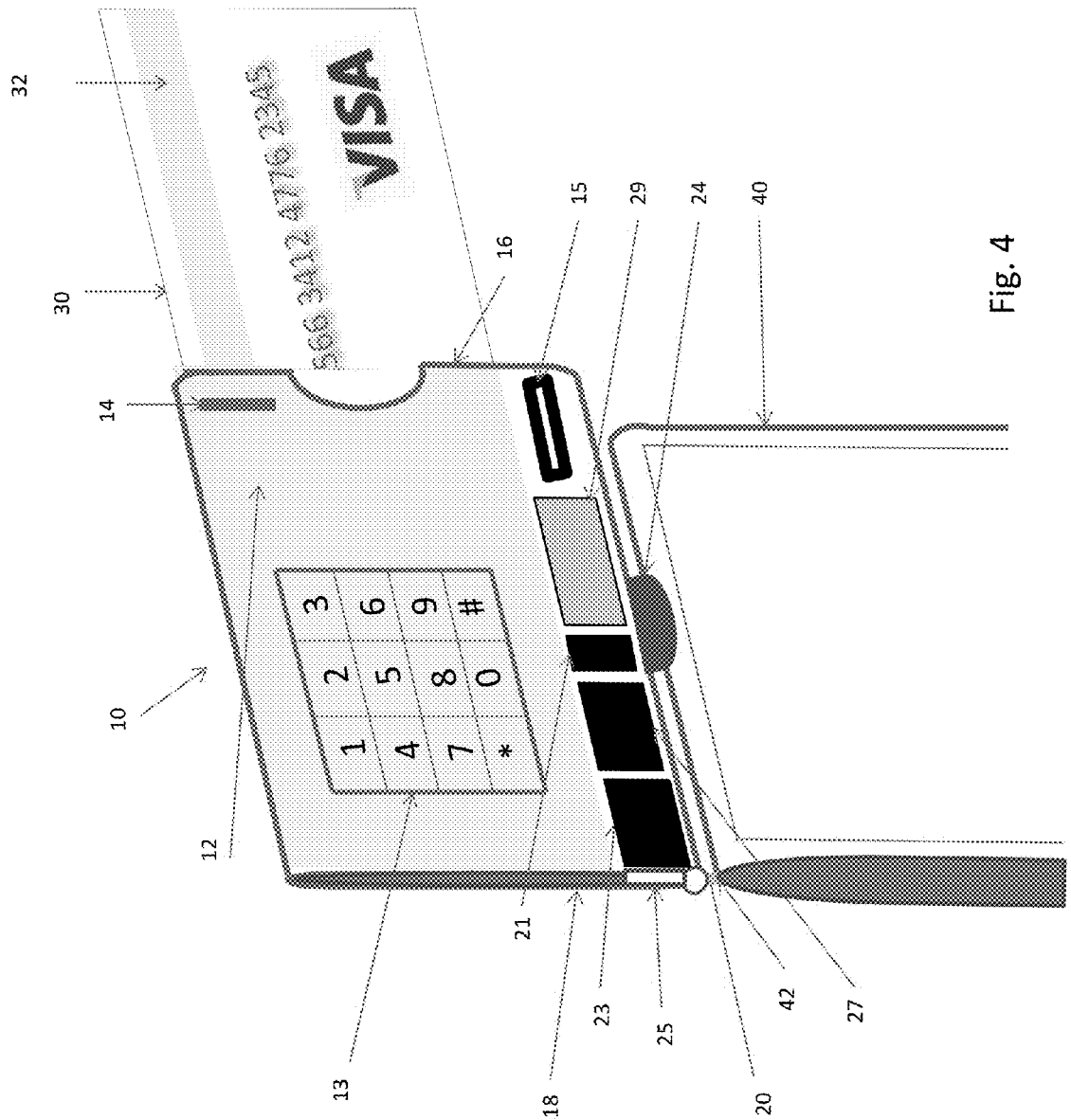
FIG. 4 is a second embodiment thereof.

FIGS. 3 and 4 show two exemplary embodiments of the card reader apparatus of the present invention. These figures show how the components of the present invention can fit on a card reader 10 having an overall slim, compact profile that is convenient for carrying in place of one or more credit cards.

The credit card reader apparatus 10 has a housing 12 that is configured and arranged to allow a user to easily carry the card reader in a fold of a wallet or in a pocket. The card reader 10 has a slim, rectangular housing 12 that can receive a credit card 30 to read data from the card 30 or to securely carry the card 30. A user inserts a card 30 through an opening 16 in the housing 12 and into a cavity connected to the opening 16. FIG. 3 shows a card 30 that is partially received in the opening 16 of the housing, and the hidden portion of the card 30 is received in the cavity defined by opposing walls of the housing 12. The opening and the cavity are preferably dimensioned to provide minimal clearance around a credit card, thereby providing a snug, secure fit of the credit card within the housing. The cavity preferably frictionally engages the credit card 30, or has a retention mechanism for selectively retaining the credit card within the cavity of the housing when a user carries the card reader.

To provide electromagnetic shielding protection to a card 30 received within the housing 12, the housing 12 includes an electromagnetic shielding material, and/or may be made entirely from the electromagnetically shielding material.

A magnetic card reader 14 is seated within the cavity within the housing 12 so that when a card is inserted into and/or removed from the housing, the data stored on the magnetic strip 32 of the credit card 30 is read from the card by the magnetic card reader. The location of the magnetic card reader 14 is shown generally in FIG. 3, though it is located on the interior wall of the cavity of the housing 12 or within the wall of the housing. A user slides a credit card into the cavity of the card reader 10, causing the magnetic strip 32 of the credit card to pass over the magnetic card reader 14. The user can optionally remove the credit card from the cavity, so another card can be read by the card reader, or the user may leave the card 30 within the housing 12 where it is protected from unauthorized scanning by the shielding material.

A central processor 27 is mounted within the housing, and is connected to the credit card reader 14, so that data read from the credit card 30 by the magnetic card reader 14 can be received by the processor 27, and directed to a memory component 28, where the credit card data is stored.

For this purpose, the read/write memory component 28 is connected to the processor 27. The memory component includes a computer readable storage medium, and is configured and arranged to receive and store credit card data from the card reader. Data corresponding to more than one credit card can be simultaneously stored in the memory component 28, and data corresponding to a single credit card can be accessed separately from data corresponding to other cards.

To broadcast data from the card reader apparatus 10 to another device, the apparatus 10 includes a radio frequency identification (RFID) device 21. The RFID device 21 is electrically connected to the processor 27. The processor 27 is configured and arranged to read credit card data from the storage location on the memory component 28. The processor 27 then sends the credit card data to the RFID device 21, which then converts the credit card data to a signal that is transmitted by the RFID device transmitter/broadcaster 21 to an RFID reader on another device (not shown).

The RFID device 21 used for broadcasting/transmitting data can be a passive RFID device, a semi-passive RFID device, or an active RFID device. Each type of RFID configuration is well known in the art.

In the embodiment of FIG. 4, a user can control the operation of the card reader 10 through a control interface (keypad)

13 that is electrically connected to the processor 27. The processor 27 and the control interface 13 are configured and arranged to selectively control reading data from the credit card 30, selectively storing the data in the memory component 28, and selectively broadcasting the card data through the RFID device 21. In one embodiment, the control interface 13 may include one or more buttons on the outer surface of the housing 12. In another embodiment, the control interface 13 is a touch screen on the outer surface of the housing 12. It is also possible to include a voice-recognition capability on the control interface, so a user may operate the card reader using voice commands.

The card reader housing 12 has a display screen 29 that displays information to a user viewing the card reader. The display 29 is electrically connected to the processor 27, and can receive a signal from the processor 27 to display information. For example, the display 29 can show which card has been selected for payment, what amount has been paid in a transaction, card information (e.g. a card name, a card expiration date, a card number), past transactions made with one or more cards, or a total amount paid with one or more of the cards on the card reader during a specific time period (e.g. a credit card billing period, or another period specified by the user).

The housing 12 includes a battery power source 36 which provides power for components such as the processor 27, the display 29, the memory component 28, the RFID device 21, and other components of the card reader 10.

The card reader apparatus further includes a retractable input/output plug 20 that is located on a second end of the housing 12. The plug 20 is electrically connected to the processor 27 and is configured to engage a socket 42 on a mobile device 40 to transmit data to and receive data from the mobile electronic device 40.

When the card reader 10 engages the mobile electronic device 40 through the plug 20 engaging the socket 42, the mobile electronic device can be used to control the card reader 10, or to communicate with another device. The mobile device 40 has its own processor, memory, and display. The mobile device can support software such as an application that provides a control interface for the card reader, or that collects data from the card reader to store or send to another device, for example, over a network connection. In this way, the mobile device provides a merchant point of sale terminal for a credit card transaction. It allows a user to emulate a credit card when buying or selling an item or making a money transfer, and to communicate that transaction to the financial institution corresponding to the credit card.

A mobile device such as a cell phone may have a global positioning system (GPS) device that allows the device to identify its location. By recognizing its location, the device 40 may send a signal to the card reader apparatus 10 that initiates a transaction or that prompts a user to begin a transaction process. For example, the mobile device 40 may recognize that the user is at a restaurant from which the user has ordered food to pick up, and the mobile device could prompt the user to begin the payment process.

To allow a user to expand the memory of the system of the card reader 10, the credit card reader apparatus 10 has a memory card reader device 23 that is connected to the processor 27. A memory card (not shown) can be inserted into the memory card reader 23 through a memory card slot 25. The processor 27 is configured to selectively store credit card data and credit card transaction data on the memory card that electronically engages the memory card reader 23.

The input/output plug 20 is preferably configured as a male plug that can engage a female audio port 42 on a mobile electronic device 40. The plug 20 is also preferably retractable, so that it can be deployed between a retracted position and an extended position. In the retracted position, the plug 20 is received substantially entirely within the housing 12. This allows a user to more easily store the card reader apparatus 10 in a wallet, a pocket, or another place for carrying the apparatus. In the extended position, the plug 20 extends from the housing 12 so that the plug 20 can be received in a socket (such as an audio port) 42 within another device (such as a mobile electronic device).

To prevent undesired pivoting/rotating of the housing 12 with respect to the mobile electronic device 40, the housing also preferably includes a mechanical stabilizer 24 on the outer surface of the housing 12. When the plug 20 is received in a socket 42 in another device 40, and when the stabilizer 24 on the housing 12 frictionally engages the mobile electronic device 40, it prevents rotation of the housing 12 with respect to the mobile electronic device 40. When the stabilizer 24 does not engage the mobile electronic device 40, the housing may rotate about the axis of rotation of the plug 20 in the socket 42 of the mobile electronic device. FIGS. 3 and 4 show the stabilizer 24 as a short post extending from the card reader 10, between the card reader 10 and the mobile device 40.

Although the preferred embodiment uses an RFID device, other near field communication devices are contemplated, and are within the scope of the present invention. For example, the card reader could communicate with other devices by way of a Bluetooth transmitter/receiver, an ultra wideband (UWB) transmitter/receiver, or another near field communication (NFC) transmitter/receiver.

The card reader 10 of the present invention can include a fingerprint reader 15 to provide additional security. The fingerprint reader 15 allows the card reader 10 to be deactivated until the fingerprint reader 15 reads the fingerprint of a recognized and authorized user of the card reader 10. The fingerprint reader 15 is connected to the processor 27, which compares fingerprint data read from the fingerprint reader 15 to fingerprint data of authorized user(s) on the memory component 28 or on a memory card (not shown). When the data from the fingerprint reader 15 matches fingerprint data in memory, the card reader 10 is electronically unlocked for use.

The housing 12 of FIGS. 3 and 4 provides space for advertising or other printed information such as ads, decorative images, or text. The housing 12 of FIG. 3 does not include a large keypad, providing more space for such printed matter.

It can therefore be seen that the card reader apparatus of the present invention provides a multi-purpose credit card apparatus that can read and store credit card data from one or more credit cards, and then transmit the data to another device to make a credit transaction. The present invention also provides a credit card reader that can securely house a credit card within an electromagnetically shielded housing. The present invention also provides a credit card reader that can read data from a credit card, store the data from the credit card so the card reader may be selectively used to make a credit transaction even when the corresponding credit card is not received in the card reader. The present invention provides a card reader that can transmit data to and receive data from a mobile electronic device, which can complete a transaction using data from the card reader. The present invention provides a stabilizer that allows the card reader to be securely supported on a mobile electronic device when the two are connected. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A credit card reader apparatus comprising:
a housing having an internal cavity and an opening at a first end thereof for receiving a credit card within said cavity;
a magnetic credit card reader seated within the cavity within said housing for reading magnetic data stored on a credit card;
a processor connected to the magnetic credit card reader;
a read/write memory component connected to the processor, said processor being configured and arranged to receive credit card data from the magnetic credit card reader and to write the credit card data to a storage location in said read/write memory component;
a radio frequency identification (RFID) device connected to the processor, said processor being configured and arranged to read said credit card data from said storage location and to provide said credit card data to said RFID device whereby said credit card data can be broadcast to an RFID reader;
a control interface connected to the processor, said processor and said control interface being configured and arranged to selectively control reading data from said credit card, selectively storing said credit card data in said read/write memory component and selectively control broadcast of said credit card data through said RFID device;
a display connected to the processor;
a power source;
an input/output plug connected to said processor, said input/output plug being configured to engage a socket on a mobile electronic device and to transmit data to and receive data from the mobile electronic device; and
a memory card reader device connected to said processor, said processor being configured to selectively write and read credit card data and credit transaction data to and from said memory card reader device.

2. The credit card reader apparatus of claim 1 wherein said RFID device is a passive device.

3. The credit card reader apparatus of claim 2 wherein the read/write memory component is capable of simultaneously storing data for a plurality of credit cards.

4. The credit card reader apparatus of claim 1 wherein said RFID device is a semi-passive device.

5. The credit card reader apparatus of claim 4 wherein the read/write memory component is capable of simultaneously storing data for a plurality of credit cards.

6. The credit card reader apparatus of claim 1 wherein said RFID device is an active device.

7. The credit card reader apparatus of claim 6 wherein the read/write memory component is capable of simultaneously storing data for a plurality of credit cards.

8. The credit card reader apparatus of claim 1 wherein the read/write memory component is capable of simultaneously storing data for a plurality of credit cards.

9. The credit card reader apparatus of claim 8, wherein the input/output plug is telescoping.

10. The credit card reader apparatus of claim 8, wherein the input/output plug is configured to engage an audio port on the mobile electronic device.

11. The credit card reader apparatus of claim 8, further comprising a stabilizer to prevent rotation of the housing with respect to the mobile electronic device.

12. The credit card reader apparatus of claim 1, wherein the input/output plug is configured to engage an audio port on the mobile electronic device.

13. The credit card reader apparatus of claim 12, wherein the input/output plug is telescoping.

14. The credit card reader apparatus of claim 12, further comprising a stabilizer to prevent rotation of the housing with respect to the mobile electronic device.

15. The credit card reader apparatus of claim 1, wherein the input/output plug is telescoping.

16. The credit card reader apparatus of claim 15, further comprising a stabilizer to prevent rotation of the housing with respect to the mobile electronic device.

17. The credit card reader apparatus of claim 1, further comprising a stabilizer to prevent rotation of the housing with respect to the mobile electronic device.

18. The credit card reader apparatus of claim 1 wherein said housing is fabricated from an electromagnetic shielding material and said housing provides electromagnetic shielding to a credit card received within said cavity.

* * * * *